Jan. 8, 1924.

E. NOEL

UNIVERSAL JOINT

Filed May 3, 1922

1,480,004

2 Sheets-Sheet 1

INVENTOR
Eli Noel.
BY
M. E. Gillham.
ATTORNEY

Jan. 8, 1924.

E. NOEL

UNIVERSAL JOINT

Filed May 3, 1922

1,480,004

2 Sheets-Sheet 2

INVENTOR
Eli Noel,
BY
M. C. Gillham.
ATTORNEY

Patented Jan. 8, 1924.

1,480,004

UNITED STATES PATENT OFFICE.

ELI NOEL, OF KANSAS CITY, MISSOURI.

UNIVERSAL JOINT.

Application filed May 3, 1922. Serial No. 558,207.

*To all whom it may concern:*

Be it known that I, ELI NOEL, a citizen of the United States, residing at Kansas City, in the county of Jackson and State of Missouri, have invented a new and useful Universal Joint, of which the following is a specification.

My invention relates to universal joints, and the object of the invention is to provide a device of this character which is inexpensive to construct and highly efficient in connection with the front driven axles of automobiles.

Another object is to provide a universal joint which may be used in connection with front drive of automobiles to provide a wide steering radius.

Figure 1:
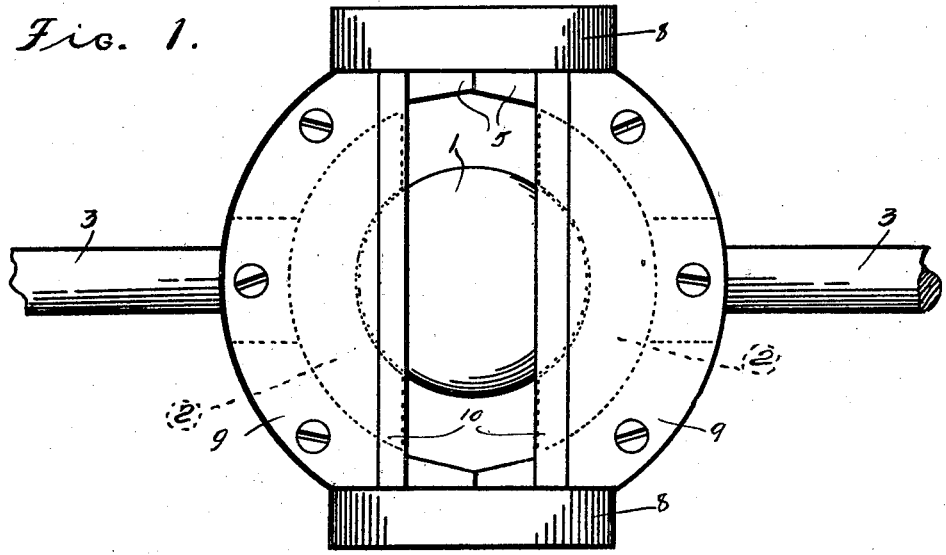
Figure 2:
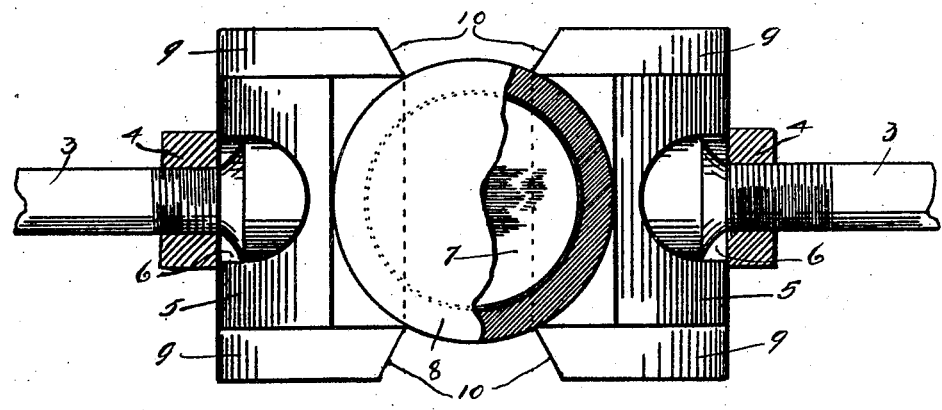
Figure 3:
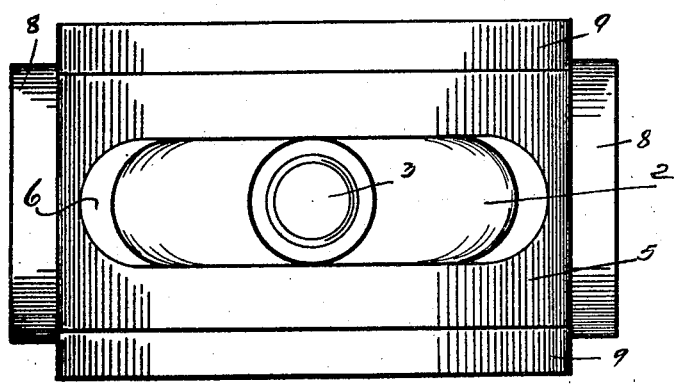
Figure 4:
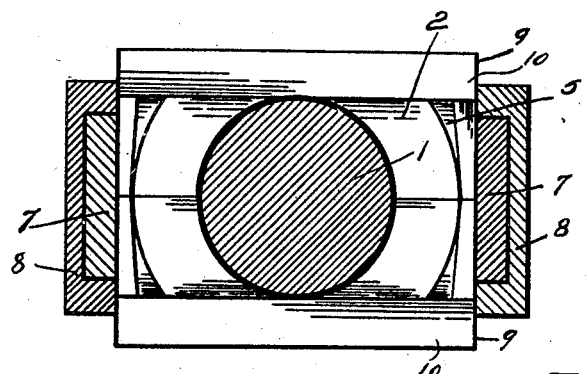
Figure 5:
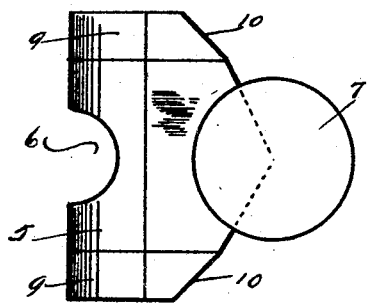
Figure 6:
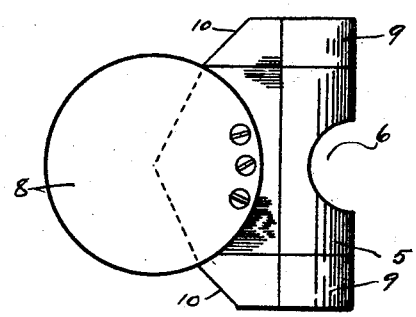
Figure 7:
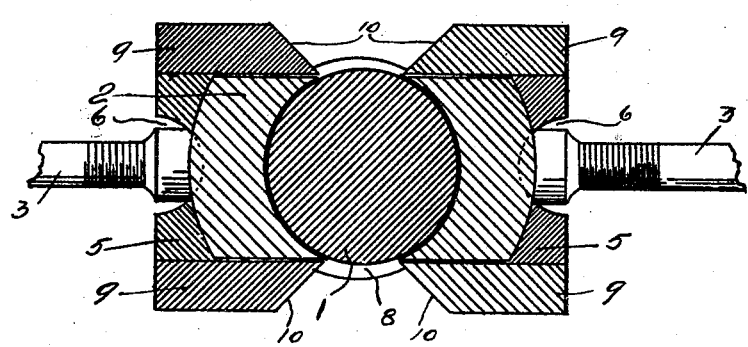

I attain these objects and other advantages by means of the mechanism and parts illustrated in the accompanying drawing in which—Figure 1, is a top view of a universal joint embodying my invention; Figure 2, is a side view of the same; Figure 3, is an end view of the same with the adjusting nut omitted; Figure 4, is a transverse section of the same; Figure 5, is a side view of one of the bearing block members, a part of the invention; Figure 6, is a side view of the other of the bearing block members, a part of my invention and, Figure 7, is a longitudinal section of the joint.

Similar numerals of reference refer to corresponding parts throughout the several views.

The universal joint comprising my invention consists of a centrally disposed spherical body 1 which forms the center of motion of the joint and around and about which the associated parts move. Bearing upon opposite sides of the spherical body are concentrically formed heads 2, having connected therewith stub shafts 3, which are respectively adapted for connection with driven axles or shafts. The stub shafts are provided adjacent the outer side of the bearing blocks with screw threads adapted for receiving screw adjusting nuts 4, for use in adjusting the heads 3, in relation to the spherical body and relative to the bearing blocks, hereinafter described. Individual concentrically formed bearing blocks 5, are arranged in opposition for the purpose of carrying the respective heads 3, and guide the shafts associated therewith, each of the bearing blocks being provided with transverse slotted apertures 6, adapted for slidably receiving the shafts. On the outer sides of one of the bearing blocks are rigidly mounted disk wheels 7, the centers of which are aligned with the horizontal axis of the spherical body when the disks are operatively assembled. On the outer sides of the other of the bearing blocks are demountably mounted circular boxes 8, which are specially adapted for receiving therein the disk wheels and thereby form a hinged connection between the two bearing blocks to permit of the flexing of the joint in vertical direction. On the upper and likewise on the lower sides of the bearing blocks are mounted plates 9, the inner edges of which are beveled to a suitable degree of angularity to allow the edges to form limiting stops to limit the vertical swing of the bearing blocks, as is shown at 10 in Figures 2, 4, 5, 6 and 7.

To assemble the universal joint constructed in accordance with my invention, the shafts 3, are extended outwardly through the slotted apertures in the bearing blocks and the respective heads 2, thereon brought to bear on the inner concaved sides of the bearing blocks, after which, if adjusting nuts are used, they are screwed on the shafts to bring the heads 2, to a suitable bearing on the bearing blocks, whereupon, the spherical body is lodged in the inner concaved sides of the heads 2, and the bearing blocks 5, are brought inwardly to allow the disk wheels 7, to be entered in their respective boxes 8, and the latter are then fastened on the sides of the adjacent bearing blocks, and, thereafter, the joint is operative.

When the joint is flexed in vertical direction, the bearing blocks swing on the hinge connection formed by the disk wheels and their boxes, in corresponding direction, the heads 2, sliding upon the spherical body. The movement is limited in both up and down direction to the angle represented by the angle representing the beveled edges of the plates 9. If the joint is flexed in horizontal direction the heads 2, are forced to slide horizontally about the spherical body, this movement being possible because the shafts connected with the heads are slidably arranged in the slotted apertures in the bearing blocks and are guided thereby. The adjusting nuts on the shafts are a convenience for taking up waste motion.

Having described my invention what I claim is—

1. A universal joint, comprising a centrally located spherical body forming the center of motion, oppositely disposed concentric slide bearings or bearing blocks provided with transverse slotted apertures, one of said bearing blocks being provided with oppositely disposed demountable circular boxes having their centers horizontally aligned with the horizontal axis of said spherical body and the other bearing block being provided with oppositely disposed trunnions mounted for angular movement in said boxes and together forming a hinge connection uniting said bearing blocks, oppositely disposed concentric heads slidably and supportingly bearing on said spherical body and on said first mentioned bearing blocks and having shafts guidingly supported thereby.

2. A universal joint, comprising a centrally located spherical body forming the center of motion, oppositely disposed concentric slide bearings or bearing blocks provided with transverse slotted apertures, one of said bearing blocks being provided with oppositely disposed demountable circular boxes having their centers horizontally aligned with the horizontal axis of said spherical body and the other bearing block being provided with oppositely disposed trunnions mounted for angular movement in said boxes and together forming a hinge connection uniting said bearing blocks, oppositely disposed concentric heads slidably and supportingly bearing on said spherical body and on said bearing blocks and having shafts guidingly supported thereby, and means associated with the shafts on said heads for adjusting the heads to the spherical body.

Kansas City, Missouri, April 21, 1922.

ELI NOEL.

Witnesses:
JOHN C. STEARNS,
ELIAS BERELL.